July 25, 1939.   I. M. STEIN   2,167,010

MECHANICAL RELAY APPARATUS

Filed Feb. 6, 1937

INVENTOR.
IRVING M. STEIN

BY
Cornelius L. Ehret
ATTORNEY.

Patented July 25, 1939

2,167,010

UNITED STATES PATENT OFFICE 2,167,010

MECHANICAL RELAY APPARATUS

Irving M. Stein, Philadelphia, Pa., assignor to Leeds & Northrup Company, Philadelphia, Pa., a corporation of Pennsylvania Application February 6, 1937, Serial No. 124,376

18 Claims. (Cl. 74—1)

My invention relates to electrical measuring instruments, more particularly to mechanical relays which include, as a control element thereof, a sensitive device, as a galvanometer, whose deflecting pointer is intermittently or periodically clamped in fixed position and thereafter engaged by one or more feelers by means of which the mechanical relay may be accurately controlled in response to deflection of the galvanometer.

My invention, though applicable to all forms of mechanical relay apparatus, is particularly useful in connection with instruments of the type generically represented by the relay structure described in U. S. Letters Patent to Squibb, No. 1,935,732, dated November 21, 1933. Mechanical relay apparatus, especially those of the type aforesaid, imposed limitations to desirable increase in the permissible sensitivity of the galvanometer employed. For example, in accord with the Squibb disclosure, viewed as generically exemplary of the prior art, galvanometer pointers or deflecting elements have been periodically clamped in fixed position by movement of a single clamping member or bar against the pointer to tilt and then to press it against a cooperating stationary clamping bar or abutment. The tilting action, while possibly bending the pointer itself, moved or tilted the moving coil of the galvanometer to apply a stress to its filamentary or other biasing or torque exhibiting suspension. Accordingly, that system necessarily was made rugged enough to withstand the intermittently or periodically applied stresses incident to the clamping of the deflecting pointer, with corresponding reduction in sensitivity. Moreover, because of the tilting action, there arose, after release of the pointer, a certain amount of oscillation of the pointer and coil; in short, there was present a certain amount of mechanical instability.

It is an object of my invention entirely to eliminate or to high degree reduce mechanical instability of the moving system of the galvanometer or equivalent, and to prevent application thereto of any stress whatsoever incident to the clamping of the pointer; and to cause the pointer always to be clamped in and without departure from its plane of free movement while unclamped.

A further object of my invention is to provide for use of galvanometers or equivalent of much higher sensitivities than heretofore practicable or permissible in or for mechanical relay systems; and, more particularly, for use in the relation aforesaid, the galvanometer to be of a type in which the desired high sensitivity is procured by reducing to a minimum the opposition to deflection offered by its suspension system without increase however of its natural period.

In accordance with one form of my invention there is provided a pair of clamping means, both movable, arranged coincidentally to engage opposite sides of the pointer in a manner to prevent application of stress to the suspension system, as by elimination of all tilting movement of the coil and pointer. Preferably each clamping means includes a pair of clamping surfaces arranged in opposition to like clamping surfaces of the other clamping means, to clamp the pointer in the plane of its deflection and at spaced regions along its length.

More specifically, the clamping means or members are suitably interconnected by mechanism interposed between their actuating means to insure simultaneous movement of both clamping members into and out of clamping engagement with the pointer. In accord with this arrangement, I have found that my invention may be readily applied to the mechanical relay apparatus, such as that of the aforesaid Squibb patent, without need for substantial change therein or redesign thereof, yet greatly increasing the sensitivity thereof.

For a more complete understanding of my invention reference should now be had to the accompanying drawing in which.

Figure 6:
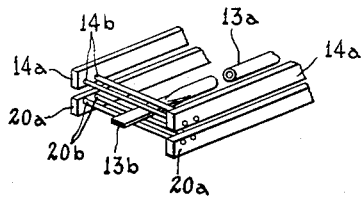
Fig. 6 is a perspective view of a modification of my invention applicable to the arrangements of Figs. 1 and 4.

Referring to the drawing, I have shown my invention in one form as applied to a mechanical relay apparatus of the type disclosed and claimed in the aforesaid Squibb patent. Only those parts of the relay apparatus necessary to an understanding of my invention are shown, since reference may be readily had to the aforesaid Squibb disclosure for further details of the apparatus not germane to my invention.

Mechanical relays or instruments of the type to which my invention is particularly directed comprise a sensitive device, as galvanometer G, a coil 10 of which is supported for rotation by means of filamentary wires 11 and 12 which may also serve as lead-in connections for the coil. Suitably secured at one end to the coil 10 is a deflecting member or pointer 13, its opposite or free end extending between clamping means disposed on opposite sides thereof.

Figure 1:
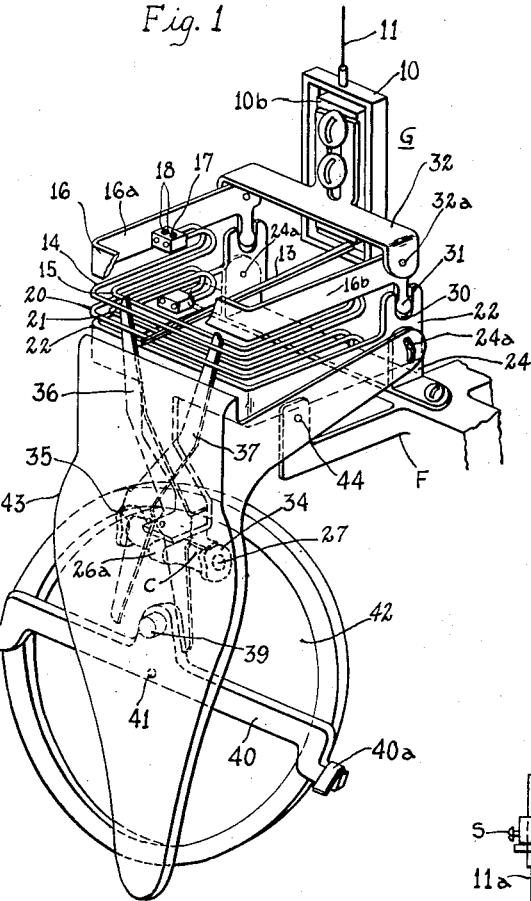
Figure 1 is a front view, in perspective, with parts broken away and certain parts omitted, of a mechanical relay apparatus embodying the invention.
Figure 2:
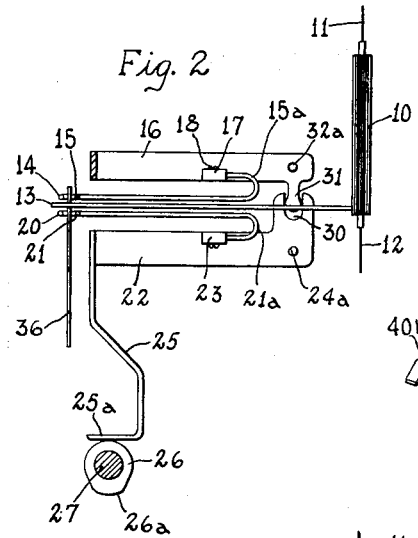
Fig. 2 is a side elevation of certain of the parts of Fig. 1, illustrating the clamping bars in positions spaced from the galvanometer pointer.
Figure 3:
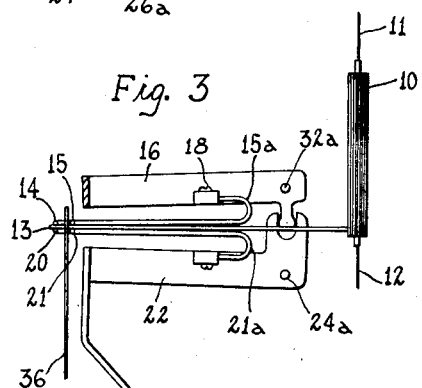
Fig. 3 is a side elevation showing parts of Fig. 2 in positions such that the galvanometer pointer is clamped between the clamping bars.

As shown in Figs. 1–3, the clamping means disposed on the upper side of the pointer 13 comprise a pair of resilient members or wires 14 and 15, the respective ends of which are rigidly secured to the respective legs or arms 16a and 16b of a U-shaped pivoted member 16. As shown, the ends adjacent arm 16a are secured to it by means of a block 17 having openings into which an end of each clamping member extends. These ends are clamped in position by means of set screws 18. It will be understood that the arm 16b carries a block identical in function and purpose with the block 17 of arm 16a. Disposed below the pointer 13 is a corresponding clamping means comprising resilient members or wires 20 and 21 secured to a pivoted U-shaped member 22 by means of blocks identical with those described above, only the block 23 of one arm of member 22 being shown.

Each of clamping bars or members 14, 15, 20 and 21 is of U shape with its cross-member or cross-portion located adjacent to the free end of the pointer and extending generally parallel to its plane of deflection. From the respective ends of the cross-member, which is at least coextensive with, and preferably greater than the limits of, the deflecting path of the pointer, there extends toward the galvanometer coil 10 the respective arms or legs. These legs near their ends are provided with return bends which form resilient loops between the supporting blocks and the cross-portions for purposes more fully to be described. All loops are identical in form, Figs. 2 and 3 illustrating the action or function of the loops 15a and 21a of members 15 and 21.

In order periodically to operate the clamping members 14, 15, 20 and 21 into and out of clamping engagement with the pointer 13, a member 22, pivoted on a bracket 24 at 24a—24a, is provided with a downward extension 25, the end 25a of which rides upon an element 26 of a cam C supported upon a continuously rotating shaft 27, this shaft corresponding to the shaft 1 of the above Squibb patent. As the shaft 27 is rotated in a clockwise direction as viewed in Fig. 2, a projection 26a of element 26 raises the cam follower 25a and because of rotation of member 22 about its pivots 24a—24a moves the clamping members 20 and 21 upward toward the outer or free end of pointer 13. The clamping members 14 and 15 are concurrently moved downwardly and toward the same end of the pointer 13 by reason of a driving connection between members 16 and 22. As shown, each of the arms of member 22 is provided with a notch or recess 30 into which extends a rounded end 31 of each arm of member 16, itself pivoted on a bracket 32 at 32a. The bracket 32 is supported from the galvanometer core 10b which is itself carried by the frame F.

Preferably the member 16 by driving connection 30, 31 is rotated downwardly an amount equal to the upward rotation of the member 22. Though the extent of rotation of the two members may differ, it is essential that the respective clamping elements 14, 15, 20, 21 coincidentally engage the outer end of pointer 13 to clamp it between them without moving it from its plane of deflection.

By clamping the pointer 13 in its deflecting plane, it is not subjected to bending moments, and no stresses of any kind are transmitted through the pointer 13 to the coil 10 and to the filamentary suspension means 11, 12, as has heretofore been the case.

If it were necessary, in restraining the pointer, to move it from its plane of movement, it is evident that both the suspension means 11, 12 and the pointer 13 would of necessity have to be made sufficiently strong and sturdy to withstand repeated application of stresses and bending moments incident to the movement of the pointer 13 from its path or plane of deflection into engagement with a stationary clamping bar. The torsional forces inherent in suspension means of the required strength were factors limiting the sensitivity of the galvanometer.

In accord with my invention, however, the sensitivity of the instrument as a whole, specifically of the relay-galvanometer, may be greatly increased without changing its period, i. e., the time required for the galvanometer pointer to return to its neutral or zero position after a given deflection thereof. The period is preferably short, and short enough for a relatively rapid return of the pointer to its position of zero deflection. To these ends the suspension means 11 and 12 comprise filamentary wires which develop torsional forces much less in magnitude than have heretofore been possible in mechanical relay apparatus, and thereby provide increased sensitivity.

To maintain the shortness of the period, the moment of inertia of the movable system as a whole, and particularly of the coil and pointer, is reduced to a minimum. Thus the coil 10 may be wound with aluminum wire or with wire of comparable or less density while the pointer may be formed of bamboo or other material of low density. It may comprise a broom-straw, a suitable grass, or, Fig. 6, an aluminum tube 13a having a very thin wall.

Since the filamentary wires 11 and 12 are not subjected to the stresses incident to the clamping of the pointer, one of them, the wire 12, may be omitted if desired and suitable connection made to the coil 10 by means of a flexible conductor which offers negligible opposition to deflection of the coil 10.

The increased sensitivity with the filamentary suspension system is substantial. In accord with typical apparatus of the prior art a change of twelve microvolts across the galvanometer circuit was required to produce a deflection of the pointer, sufficient (i. e. of about one-thousandth inch) to produce operation of the connecting mechanism interposed between the driving and driven members of the mechanical relay.

In accord with the present invention the sensitivity may be increased as much as 140%, that is to produce the same deflection with a change of voltage of about nine microvolts, without decreasing the usual period of two seconds. By using a pointer of bamboo of generally the same dimension of pointers heretofore used in relays of the type shown by the aforesaid Squibb patent, and by reducing the lateral dimensions of the galvanometer coil, the period may be decreased, without change in sensitivity, as much as 35%; and further decrease thereof may be obtained by using aluminum wire for the coil and a thin-walled tube of aluminum for the pointer. In short, either the sensitivity or the period may be much improved or the period decreased with improved sensitivity over prior art mechanical relays.

Because the pointer 13 is made as light as practicable, its strength is reduced and it is therefore desirable to clamp its outer end at spaced regions. To that end the clamping member is provided with spaced clamping surfaces arranged in opposition to like clamping surfaces on the lower clamping member, these spaced surfaces, in this modification of my invention, comprising the cross-portions of the upper clamping members 14 and 15, which are spaced laterally or lengthwise of the pointer, and cooperate with like surfaces of the cross-portions of the lower and opposing clamping members 20 and 21, to clamp between them a portion of the pointer. If the pointer comprises a thin-walled tube its outer end may be flattened, the flat surface or sides being engaged by the clamping members.

Substantially entirely to prevent the setting up of longitudinal forces on the pointer 13 and/or to avoid sliding movement of members 14 and 20 with respect to the pointer 13 as members 15 and 21 are moved into engagement with the pointer, the return bend or resilient loop of each clamping member produces an effect and result identical with that obtained if clamping members 14, 15, 20 and 21 were supported for pivotal rotation about axes co-planar with the galvanometer pointer 13. Specifically, the return bends provide for a slight tilting action of the members 14 and 20 and for adjustment of those members 15 and 21 to insure coincidental engagement of the pointer by all of the clamping surfaces and to avoid transmission of stresses to the galvanometer which would arise if substantial horizontal movement of the clamping members occurred upon their contact with the pointer. The positions of the parts with the pointer 13 firmly clamped in position are shown in Fig. 3.

If the clamping members are pivoted about an axis or axes substantially co-planar with the plane of deflection of the galvanometer pointer, the return bends may be omitted and single upper and lower clamping members 14a and 20a, Fig. 6, provided, said members respectively having clamping wires or surfaces 14b and 20b spaced longitudinally of the pointer 13a.

As the pointer 13 is clamped into position, additional elements 34 and 35 of cam C release a pair of feelers 36 and 37 for pivotal movement, under the influence of a biasing spring (not shown) towards the pointer. Both feelers have their outer ends disposed between the adjacent clamping surfaces of members 14, 15 and 20, 21, so that one or the other of them engages that portion of the pointer which interconnects the clamping surfaces. In this manner the additional supporting surfaces provided for the pointer enable it better to withstand periodic engagement by one or the other of the feelers since the short length thereof between the clamping surfaces is more rigid, and less likely to be broken than if single clamping surfaces were utilized. Moreover, the aforesaid snort length of the pointer may be somewhat stronger than the remaining length thereof. For example, when the pointer is formed from an aluminum tube 13a, Fig. 6, the feelers may engage opposite edges of a flattened end 13b thereof, while the clamping members engage its flat sides. In consequence, the moment of inertia of the pointer may be greatly reduced by constructing it of a material of very low density and of small cross-sectional area. Such a pointer as a whole may be fragile, easily deformable and broken, but because of the supporting and clamping surfaces on opposite sides of the feelers and the absence of bending moments it is satisfactory.

For subsequent operations of the relay apparatus reference may be had to the above Squibb patent for a complete description thereof.

In brief, if the galvanometer pointer 13 is in a deflected position, movement of one of the feelers 36, 37 is arrested while the other feeler continues its movement, the lower end thereof engaging a projection 39 of a clutch arm 40 pivoted at 41. As the feeler continues its movement into engagement with the pointer, its lower end rotates the projection 39 and clutch arm 40 to pre-set that arm with respect to a clutch disk 42. By means of additional cam elements (not shown) of cam C, a plate 43 pivoted at 44 to the frame F is movable in a counterclockwise direction to move the clutch arm into driving or connecting engagement with the disk 42. By means of a driving member, comprising one or the other of a pair of restoring cams (not shown), which engages one or the other of outer ends 40a and 40b of the clutch arm, the arm is restored to its original horizontal position, the driven disk 42 rotating with it a corresponding amount.

Since the shaft 27 and cam C are rotating at constant speed, the projection 26a of cam element 26, after a short interval, lowers cam-follower 25a and thereby moves the member 22 in a counterclockwise direction, as viewed in Fig. 2, about its pivot 24a concurrently to move the member 16 in a clockwise direction. In this manner the clamping members 14, 15, and 20, 21 are simultaneously moved away from the pointer 13 and out of clamping engagement therewith. Concurrent disengagement of the pointer has been found to be desirable, particularly in those cases where there is any tendency of the pointer to adhere to the clamping surfaces.

Figure 4:
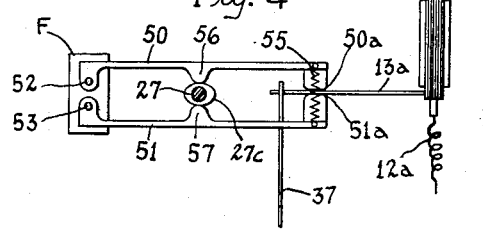
Fig. 4 is a side elevation of a modified form of galvanometer-pointer clamping arrangement.
Figure 5:
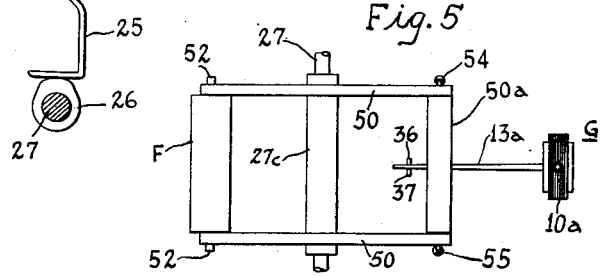
Fig. 5 is a plan view of the arrangement of Fig. 4.

In a modified form of my invention, Figs. 4 and 5, duplicate clamping members 50 and 51 may be pivoted at 52 and 53 for rotation about axes substantially co-planar with the plane of deflection of galvanometer pointer 13a. In this modification the clamping surfaces 50a and 51a may be of resilient material, fibre, soft rubber or other material suitable for a given galvanometer pointer; or the spaced wires of Fig. 6 may be utilized with the feelers spaced therebetween. As shown, the surfaces 50a and 51a are biased into engagement with the pointer by means of tension springs 54 and 55. By means of a cam 27c, symmetrical crests of which are engaged by cam followers 56 and 57 of members 50 and 51, the surfaces 50a and 51a are concurrently movable into and out of clamping engagement with the pointer 13a.

As described in connection with the embodiment of Figs. 1–3, extremely high sensitivity may be obtained in accord with the modification of Figs. 4 and 5. As shown, the galvanometer coil 10a is suspended by a single filamentary wire 11a which also provides, in conjunction with locking screw S and slide 11b, for vertical adjustment of coil 10a to insure deflection of the pointer when unclamped in a plane coincident with its plane when clamped, i. e. to position the pointer for simultaneous engagement by the clamping surfaces. A very flexible light-weight wire 12a of pure silver or the like is provided for the lead-in connection to the opposite end of the coil.

While I have shown particular embodiments of my invention, it will be understood that I do not limit myself thereto, since many modifications may be made, and I, therefore, contemplate by the appended claims to cover any such modifications as fall within the spirit and scope of my invention.

What I claim is:

1. In an instrument comprising a galvanometer having a pointer and a coil for deflecting said pointer along a predetermined path, and filamentary means for rotatably supporting said coil and pointer, means for restraining said pointer in fixed oosition without flexure thereof and without application of stress to said suspension means comprising clamping members having clamping surfaces, coextensive with the range of deflection of said pointer, disposed on opposite sides of said pointer, and means for movably mounting said members simultaneously to engage and disengage said pointer while in its predetermined path of deflection and without displacement of the pointer in any direction.

2. An instrument comprising a deflecting member, means for deflecting said member to positions between predetermined limits, clamping members, disposed on opposite sides of said deflecting member, intermittently and simultaneously movable into and out of engagement with said deflecting member for clamping it in every deflected position, a driven member, and means including at least one feeler intermittently engaging said deflecting member while engaged by said clamping members for controlling operation of said driven member.

3. A mechanical relay system comprising, in combination with a driving member, a driven member, and mechanism for connecting said driving and driven members, of a deflecting member, movable clamping members approaching said deflecting member and clamping it between them without departure thereof from its plane of deflection when free of said clamping members, and means controlling said connecting mechanism in accord with the position of said deflecting member when clamped.

4. In an instrument comprising a galvanometer having a pointer secured to a movable coil, filamentary suspension means for said coil, and means controlled by deflection of said pointer and including at least one feeler, means restraining said pointer in fixed position without application of stress to said suspension means comprising clamping members intermittently and simultaneously movable from opposite sides of said pointer, into and out of clamping engagement therewith, and means for moving said feeler against said pointer while held in fixed position by said clamping members.

5. In a mechanical relay comprising a galvanometer having a pointer secured to a movable coil, and filamentary suspension means for said coil, means restraining said pointer in any deflected position thereof without application of stress to said suspension means comprising clamping surfaces spaced one from the other on one side of said pointer and coextensive with the range of deflection of said pointer, and coextensive opposing clamping surfaces on the opposite side of said pointer, means for intermittently and simultaneously moving all of said surfaces into and out of clamping engagement with said pointer, and means controlled by deflection of said pointer and including at least one feeler movable between said clamping surfaces.

6. In a mechanical relay comprising a galvanometer having a pointer secured to a movable coil, and filamentary suspension means for said coil, means momentarily restraining said pointer in fixed position without application of stress to said suspension means comprising clamping surfaces spaced one from the other on one side of said pointer and coextensive with the range of deflection of said pointer, and coextensive opposing clamping surfaces on the opposite side of said pointer, means for intermittently and simultaneously moving all of said surfaces into and out of clamping engagement with said pointer, and means controlled by deflection of said pointer and including at least one feeler pivoted for movement, between said spaced clamping surfaces, into and out of engagement with said pointer.

7. In a mechanical relay comprising a galvanometer having a pointer secured to a movable coil, and filamentary suspension means for said coil, means momentarily restraining said pointer in fixed position without application of stress to said suspension means comprising clamping surfaces spaced one from the other on one side of said pointer and coextensive with the deflecting range of said pointer, and coextensive opposing clamping surfaces on the opposite side of said pointer, means for intermittently moving all of said surfaces simultaneously to clamp between them, said pointer, and means controlled by deflection of said pointer and including a pair of feelers disposed between said spaced clamping surfaces and pivoted for movement into and out of engagement with the portion of said pointer interconnecting said spaced surfaces.

8. In a mechanical relay comprising a galvanometer having a pointer secured to a movable coil, and filamentary suspension means for said coil predetermining a deflecting path for said pointer, clamping surfaces spaced one from the other on one side of said pointer and coextensive with said deflecting path, and opposing coextensive clamping surfaces on the opposite side of said pointer, means for intermittently producing a clamping action of said surfaces upon said pointer to retain it in fixed position along its path of deflection, and a feeler, pivoted for movement in the space between said spaced surfaces, for engaging said pointer.

9. In a mechanical relay comprising a galvanometer having a pointer secured to a movable coil, and filamentary suspension means for said coil, clamping surfaces spaced one from the other on one side of said pointer, and opposing clamping surfaces on the opposite side of said pointer, means for intermittently producing a clamping action of said surfaces upon said pointer to retain it in a fixed position, a driven member, and rigid feeler means intermittently operable into and out of engagement with the portion of said pointer clamped in fixed position between said spaced surfaces for predetermining in accord with the direction and extent of deflection of said pointer the direction and extent of movement of said driven member.

10. In an instrument having a deflecting member, the combination of clamping surfaces on one side of said member spaced apart one from the other, opposing clamping surfaces on the opposite side of said member, a pair of feelers pivotally mounted between said spaced surfaces, actuating means for simultaneously moving the clamping members on opposite sides thereof and in opposite directions into and out of clamping engagement with said pointer, and actuating means for moving said feelers into and out of engagement with said deflecting member, said first and second-named actuating means operating in succession to insure clamping of said deflecting member by said surfaces prior to engagement of said member by said feelers.

11. An instrument comprising a pointer deflecting in accord with change of a condition, a pair of pivoted feelers each biased toward said pointer, means restraining said feelers in positions spaced from said pointer, clamping surfaces on opposite sides of said feelers and below said pointer, an opposing pair of clamping surfaces above said pointer, means for intermittently and simultaneously moving said surfaces above and below said pointer into and out of clamping engagement therewith, and releasable means for freeing said feelers while said surfaces are in said clamping engagement.

12. In combination, a galvanometer having a deflecting pointer, a pair of U-shaped members, one of said members having spaced clamping surfaces on one side of said pointer, and the other of said members having opposing clamping surfaces on the opposite side thereof, intermittently operated actuating means for controlling movement of one of said members toward and away from said pointer, and a pivoted member driven by said actuating member for controlling movement of the other of said members toward and away from said pointer, said clamping surfaces coincidentally engaging and disengaging said pointer on opposite sides thereof to restrain it in fixed position, means operable in accord with the extent of deflection of said pointer, and a pivoted member, movable between said surfaces, to engage said pointer while restrained in fixed position, for controlling operation of said means.

13. In combination, a sensitive device having a movable element including a deflecting pointer, pivotal mounting means for said element, members on opposite sides of said pointer, said members having surfaces disposed for engagement with said pointer for all deflecting positions thereof, means controlling movement of said members for coincidental clamping engagement and disengagement of said pointer by said surfaces to prevent transmission of stress to said mounting means, a pair of feelers movable into and out of engagement with said pointer, and means for adjusting said mounting means for deflection of said pointer in the same plane in which it is intermittently clamped by said surfaces.

14. In combination, a sensitive device having a movable element including a deflecting pointer, pivotal mounting means for said element, pivoted members on opposite sides, and extending generally parallel to the plane of movement, of said pointer, each of said members having a clamping surface opposed to those of the other member for clamping in fixed position the free end of said pointer for all deflecting positions thereof, means biasing said members toward said pointer, means for intermittently and simultaneously moving said members out of, and releasing the same for movement to, said clamping position and means for adjusting said mounting means for deflection of said pointer in a plane in which it is coincidentally engaged by said opposing clamping surfaces thereby to prevent application of stress to said mounting means.

15. An instrument comprising a sensitive device having a pointer deflecting along a predetermined path and actuating means therefor, means operable throughout the path of deflection of said pointer for restraining said pointer in fixed position comprising clamping members disposed on opposite sides of said pointer, means pivoting said members for substantially simultaneous engagement of said pointer by spaced regions of each of said members, and means for moving said members simultaneously to clamp between said spaced regions said pointer without displacement of said pointer in any direction.

16. An instrument comprising a sensitive device having a pointer deflecting along a predetermined plane and actuating means therefor, means for restraining said pointer in fixed position within its plane of deflection comprising clamping members disposed on opposite sides of said pointer, means pivoting said members for rotation about axes substantially co-planar with said plane of deflection to provide for simultaneous engagement of said pointer by spaced regions of each of said members, and means for moving said members simultaneously to clamp between said spaced regions said pointer without displacement of said pointer in any direction.

17. An instrument comprising a sensitive device having a pointer deflecting along a predetermined plane and actuating means therefor, means for restraining said pointer in fixed position within its plane of deflection comprising clamping members disposed on opposite sides of said pointer, pivot means for each of said members spaced from said plane of deflection for producing pivotal movement of said members of the same character as though said pivotal means were co-planar with said plane of deflection, and means for moving said members simultaneously to clamp between said spaced regions said pointer without displacement of said pointer in any direction.

18. In a mechanical relay comprising a sensitive device having a pointer deflecting between predetermined limits along a predetermined plane and an actuating coil therefor, a pair of pivoted supporting members, disposed on opposite sides of said pointer, each having arms spaced laterally from said pointer, a pair of U-shaped resilient clamping bars secured to each of said arms, the arms of each of said bars extending generally parallel to said pointer and the cross-members of each of said bars at least as great in length as the distance between opposite deflecting limits of said pointer, means for periodically tilting one of said members to move the cross-members of its associated clamping bars into engagement with said pointer, and a driving connection between said one member and the other of said members for producing movement of its associated clamping bars into engagement with said pointer, said bars of each of said members simultaneously engaging said pointer to clamp it between them in its deflecting plane.

IRVING M. STEIN.